United States Patent
Leigh et al.

(10) Patent No.: US 11,139,898 B2
(45) Date of Patent: Oct. 5, 2021

(54) NODE-DIVISION MULTIPLEXING WITH SUB-WDM NODE PORTS FOR PSEUDO-ALL-TO-ALL CONNECTED OPTICAL LINKS

(71) Applicant: Hewlett Packard Enterprise Development LP, Houston, TX (US)

(72) Inventors: Kevin B. Leigh, Houston, TX (US); Timothy S. McCann, New Orleans, LA (US); Brian T. Purcell, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 99 days.

(21) Appl. No.: 16/510,697

(22) Filed: Jul. 12, 2019

(65) Prior Publication Data

US 2021/0013973 A1   Jan. 14, 2021

(51) Int. Cl.
| | | |
|---|---|---|
| *H04B 10/80* | (2013.01) | |
| *H04J 14/02* | (2006.01) | |
| *H04B 10/25* | (2013.01) | |
| *G06F 13/20* | (2006.01) | |
| *H04B 10/40* | (2013.01) | |

(52) U.S. Cl.
CPC ........... *H04B 10/801* (2013.01); *G06F 13/20* (2013.01); *H04B 10/25* (2013.01); *H04B 10/40* (2013.01); *H04J 14/0227* (2013.01); *G06F 2213/40* (2013.01)

(58) Field of Classification Search
CPC .............................. G06F 13/20; G06F 2213/40
See application file for complete search history.

(56) References Cited

U.S. PATENT DOCUMENTS

| | | |
|---|---|---|
| 8,805,155 B2 | 8/2014 | Kewitsch |
| 8,891,965 B2 | 11/2014 | Fuerst et al. |
| 9,258,628 B2 | 2/2016 | Strasser et al. |
| 9,401,774 B1 | 7/2016 | Mineo et al. |
| 9,819,436 B2 | 11/2017 | Younce et al. |
| 2017/0105060 A1* | 4/2017 | Oltman ............... H04Q 11/0005 |
| 2020/0314511 A1* | 10/2020 | Rickman ............ H04Q 11/0066 |

OTHER PUBLICATIONS

Saengudomlert, P. et al.; "Dynamic Wavelength Assignment for WDM All-optical Tree Networks"; Aug. 2005; 11 pages.

\* cited by examiner

*Primary Examiner* — Casey L Kretzer
(74) *Attorney, Agent, or Firm* — Sheppard Mulling Richter & Hampton LLP

(57) ABSTRACT

A pseudo all-to-all connected system for optical communications are provided. A plurality of nodes are grouped into a node-division multiplexing (NDM) node. An electrical shuffle comprising a plurality of electrical traces connects each port of the plurality of nodes to at least one optical transceiver. The at least one optical transceiver is configured to multiplex a plurality of electrical signals from the plurality of nodes into a plurality of wavelength division multiplexing (WDM) optical signals, the electrical shuffle being configured to route the plurality of electrical signals from each port of the plurality of nodes to form one of a plurality of ordered sequences of signals from the plurality of nodes. A fiber shuffle is configured to route the plurality of WDM optical signals to and from a plurality of NDM connectors.

20 Claims, 10 Drawing Sheets

નોડ-DIVISION MULTIPLEXING WITH SUB-WDM NODE PORTS FOR PSEUDO-ALL-TO-ALL CONNECTED OPTICAL LINKS

DESCRIPTION OF RELATED ART

Multiple emerging applications demand high bandwidth and low latency between nodes in the system. Such applications include Big Data processing, image recognition, machine learning, and artificial intelligence (AI), among others. To achieve the required bandwidth and latency for these applications, large systems are required of interconnected computing devices. Such large system generally require large areas to be deployed to accommodate the large number of point-to-point connections required, comprise a large number of heavy power consumption devices (e.g., compute nodes, memory nodes, etc.), and entail large capital and operating costs.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Some of the figures included herein illustrate various embodiments of the invention from different viewing angles. Although the accompanying descriptive text may refer to elements depicted therein as being on the "top," "bottom" or "side" of an apparatus, such references are merely descriptive and do not imply or require that the invention be implemented or used in a particular spatial orientation unless explicitly stated otherwise.

The figures are not exhaustive and do not limit the present disclosure to the precise form disclosed.

DETAILED DESCRIPTION

Embodiments of the present disclosure provide lower cost, smaller volumetric systems for providing pseudo all-to-all connectivity between sets of nodes. As discussed in greater detail below, the embodiments discussed herein allocate a partial set of wavelengths within a wave-division multiplexing (WDM) wavelength set to each node port in the system (e.g., two wavelengths per port for a 4λ WDM). This allocation results in "sub-WDM" node port allocation. Utilizing "node-division multiplexing" (NDM) connectors and cables, two smaller sets of nodes can be interconnected. Each NDM cable comprises multiple optical fibers, where each fiber consists of a varying sequence of WDM wavelengths representing a permutation of the partial-set node order. That is, node ports are multiplexed within each cable. Multiple NDM cables can be used to interconnect two larger sets of nodes to create a system-wide pseudo-all-to-all connectivity. This connectivity can be accomplished by means of commercial off-the-shelf (COTS) optical cables or blindmate-connected parallel fiber ferrules, further reducing the overall cost by reducing the need for all connections to be made with specialized cable assemblies. Common printed circuit board (PCB) designs can be utilized for electrical trace shuffles between the smaller sets, with unique fiber shuffles being modularly installable for one of the two larger sets of nodes.

Figure 1:
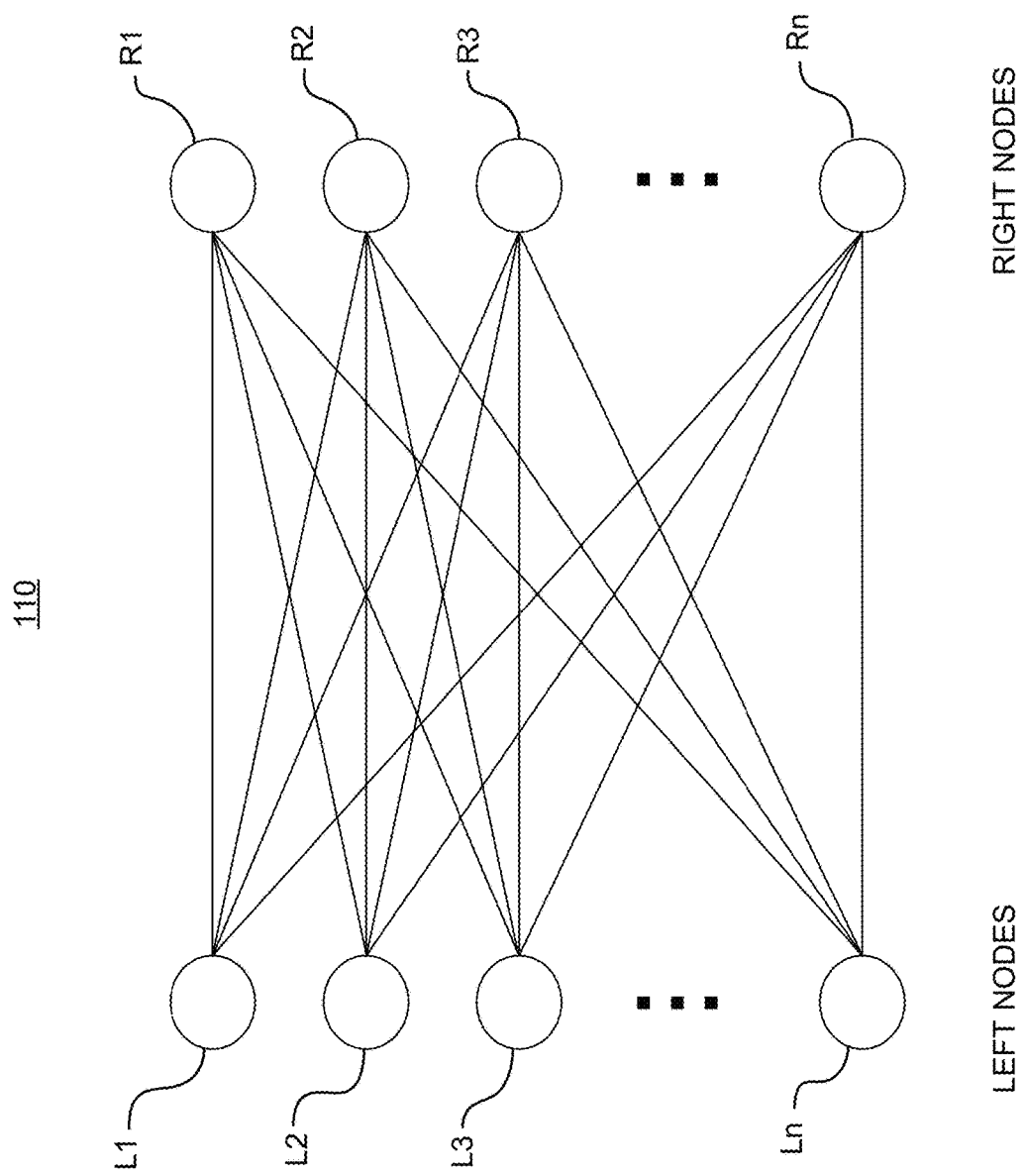
FIG. 1 is an example pseudo all-to-all connectivity model in accordance with embodiments of the technology disclosed herein.

In pseudo all-to-all connectivity, each of the nodes on one side of a system is connected with all of the nodes on the other side of the system. FIG. 1 illustrates an example pseudo all-to-all connectivity model in accordance with the present disclosure. As shown, a set of left nodes L1-Ln and a set of right nodes R1-Rn make up an example system 110. Each node can comprise a plurality of ports that are in turn connected to servers, compute processors, accelerators, bridges, optical transceivers, etc. Left node L1 comprises a point-to-point connection with each one of right nodes R1-Rn. The remaining left nodes L2-Ln comprise their own set of point-to-point connections with each one of right nodes R1-Rn. In this way, every node on one side of system 110 is communicatively coupled to all of the nodes on the opposite side of system 110. However, because the nodes on the same side of system 110 are not connected, the connectivity of system 110 is only pseudo all-to-all. For example, left node L1 is not capable of directly communicating with any of left nodes L2-Ln, but is capable of indirectly communicating with left-side nodes L1-Ln through one of right nodes R1-Rn (to which both nodes L1 and Ln are connected). Therefore, all-to-all communication is only indirectly possible (e.g., pseudo all-to-all), as opposed to true all-to-all connectivity (wherein all nodes are directly connected to all other nodes in the system). In some embodiments, additional ports may be provided so that nodes on a given side of system 100 can be connected.

Current methods of optically connecting a system like system 110 for pseudo all-to-all connectivity are limited to full fiber pair usage per port for transmit and receive communication. Therefore, as these connections are all point-to-point connections, each node (including left nodes L1-Ln and right nodes R1-Rn) comprises an n number of ports (e.g., faceplate connectors) and $n^2$ cables will be required. As system 110 is scaled up to include more nodes (to meet requirements of the emerging applications), the number of ports exponentially grows, increasing the number of optical transceivers, faceplates, optical cables, cost, and size of system 110. As a non-limiting example, system 110 comprises 64 nodes—32 left nodes and 32 right nodes. To achieve the pseudo all-to-all connectivity discussed, a total of 1,024 faceplate connectors and optical cables would be required. If the total number of nodes in system 110 was simply doubled to 128 total nodes (64 left nodes, 64 right nodes), the total number of faceplate connectors would increase by a factor of 4 (increasing to 4,096 separate ports). Each faceplate connector increases the overall size of a node, thereby increasing the overall size of system 110. Moreover, an equivalent number of optical cables would be required to interconnect the nodes, which makes increases the difficulty of installing and servicing the system, and increasing the risk of incorrect cabling. Further, the large number of cables also increases the physical area needed to practically minimize cable interferences. Power and cooling requirements would also increase due to the larger number of nodes in the system.

In addition, each node is connected to another node over an individual cable, having all the available bandwidth for that connection. There is no crossover between cables connecting nodes on each side of system 110. Therefore, if any connection is only utilizing half of its bandwidth, the other half of the bandwidth available in a particular cable is lost as no other connection can utilize this unused bandwidth. A port of a node may comprise multiple channels where a channel may be transported using an optical signal having a wavelength. Utilizing WDM signals, multiple channels may be transported using different wavelengths over a fiber. Therefore, a port of a node needing a bandwidth high enough to take advantage of WDM signals can benefits by using multiple wavelengths over a fiber, saving power, space and cost. However, when a port of a node needs a bandwidth high enough to take one or very few number of channels, full range of wavelengths that a WDM method may offer cannot be taken advantage.

Figure 2:
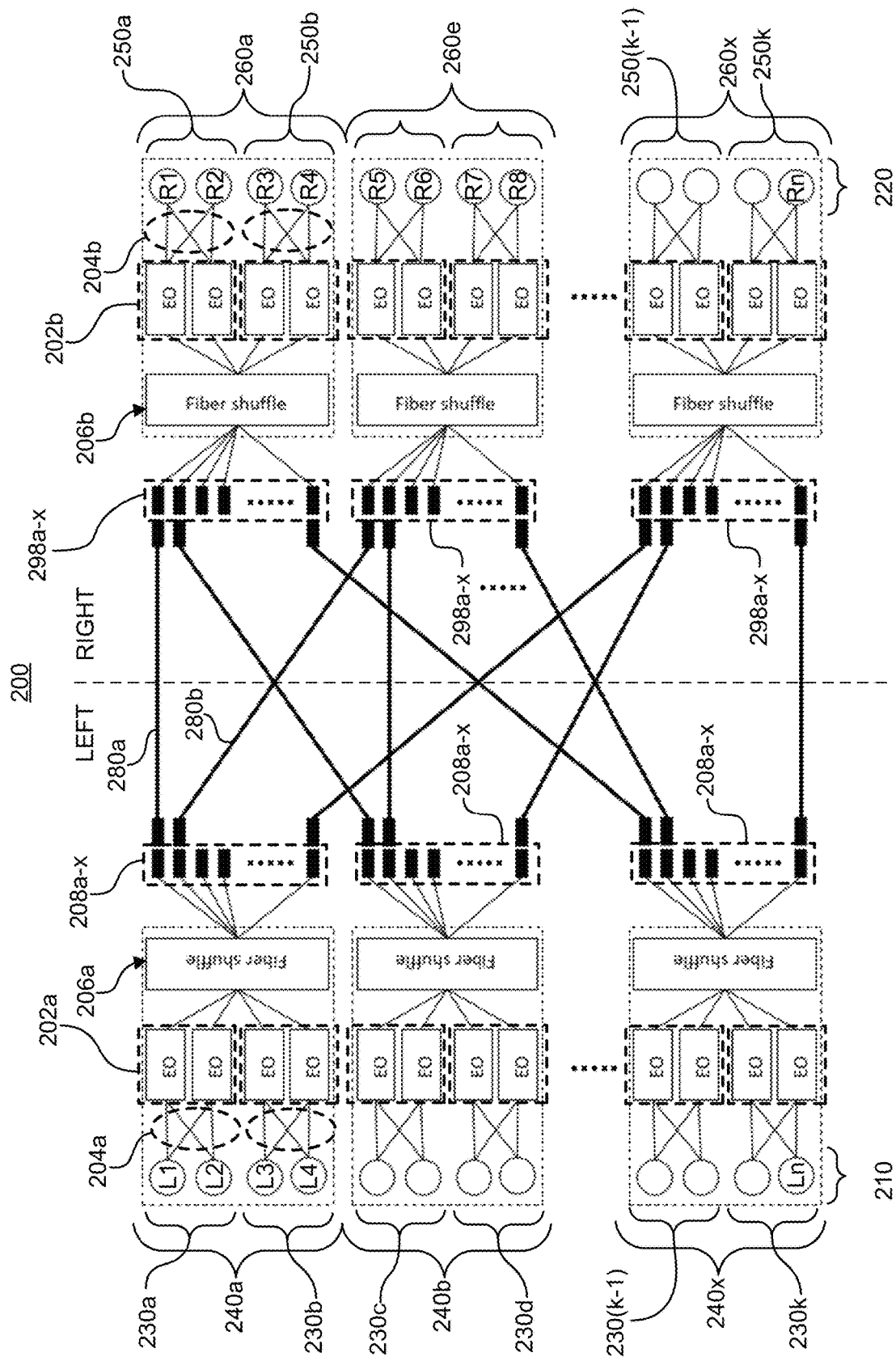
FIG. 2 illustrates an example system in accordance with embodiments of the technology disclosed herein.

FIG. 2 illustrates an example system 200 in which embodiments of the technology disclosed herein can be implemented. Example system 200 is provided for illustrative purposes and should not be interpreted as limiting the scope of the subject matter. Descriptions related to common references used in the figures apply equally to each figure having an instance of the reference, unless explicitly stated otherwise. Unless explicitly stated, the description of the nodes within the system apply equally to the left side of system 200 or the right side of system 200. For example, the left side of system 200 can include a plurality of left-side electrical shuffles 204a (discussed in greater detail below) and the right side of system 200 can include a plurality of right-side electrical shuffles 204b. In various embodiments, left-side electrical shuffles 204a can be structurally similar to right-side electrical shuffles 204b, such that the routing of electrical lanes is mirrored on the left side of system 200 and the right side of system 200. Overall, in various embodiments the components of the left side of system 200 can be "mirror images" of the components on the right side of system 200 unless specifically stated otherwise (e.g., left-side fiber shuffles 206a being straight-through fiber shuffles whereas right-side fiber shuffles 206b comprise cross-connects (i.e., non-straight-through)). As shown, system 200 includes a left side and a right side (e.g., corresponding transmit and receive sides of an optical system), comprising a left-side N-set 210 of left nodes L1-Ln and right-side N-set 220 of right nodes R1-Rn, respectively. Each N-set of nodes 210, 220 comprise the same number (N) of nodes.

In various embodiments, each N-set of nodes 210, 220 can be organized into a plurality of M-sets of nodes (i.e., a plurality of M-sets of left nodes 230a-k, a plurality of M-sets of right nodes 250a-k). Each M-set of nodes 230a-k, 250a-k comprises a number (M) of nodes supported by a WDM wavelength set. As illustrated in FIG. 2, a first M-set of left nodes 230a comprises left nodes L1, L2, and a second M-set of left nodes 230b comprises left nodes L3, L4. In other embodiments, each M-set of nodes 230a-k, 250a-k can comprise more nodes, including but not limited to two nodes, four nodes, eight nodes, among others. Each M-set of nodes 230a-k, 250a-k can be communicatively connected to an optical transceiver 202a, 202b through an electrical shuffle 204a, 204b, respectively. Specifically, each M-set of left-side nodes 230a-k can be communicatively connected to a left-side optical transceiver 202a through a left-side electrical shuffle 204a, whereas each M-set of right-side nodes 250a-k can be communicatively connected to a right-side optical transceiver 202b through a right-side electrical shuffle 204b. In various embodiments, optical transceivers 202a, 202b can comprise a plurality of different lanes, including but not limited to 32-lanes, 24-lanes, and 16-lanes, among others. The number of lanes of optical transceivers 202a, 202b can be based on the number of nodes. Each electrical shuffle 204a, 204b can route each port of a given node to create an ordered sequence of electrical signals for conversion by optical transceivers 202a, 202b. As a non-limiting example, each left-side node L1, L2 of the first M-set of left-side nodes 230a can comprise eight ports, with left-side electrical shuffle 204a comprising a plurality of 16 electrical traces (eight for L1, eight for L2) routing each port of left-side nodes L1, L2 to a respective electrical-to-optical (EO) converter of a 16-lane left-side optical transceiver 202a. As stated above, left-side electrical shuffles 204a and right-side electrical shuffles 204b can be structurally similar, comprising the same routing of electrical traces so that the arrangement of ordered sequences is a mirror image on the left side of system 200 and the right side of system 200 (i.e., the same ordered sequence of signals on the same numbered optical fiber on a left-side connector 208 and on a right-side connector 298). The arrangement of ordered sequences of signals is discussed in greater detail with respect to FIGS. 3 and 4.

As discussed above, embodiments of the present disclosure implement node-division multiplexing (NDM), wherein signals from a set of nodes are multiplexed together onto each fiber of an output connector (i.e., a left-side NDM connector 208a-x or right-side NDM connector 298a-x). This allows the nodes to be multiplexed onto the same fiber in an ordered sequence. As shown in FIG. 2, the signals of groups of M-sets of nodes 230a-k, 250a-k are shuffled together to create NDM nodes 240a-x, 260a-x. Although illustrated as containing two M-sets of nodes 230a-k, 250a-k, a person of ordinary skill in the art would understand that the technology disclosed herein is applicable to other size NDM nodes 240a-x, 260a-x, such as other embodiments where each NDM node 240a-x, 260a-x contains more or fewer M-sets of nodes 230a-k, 250a-k. For ease of discussion, NDM nodes 240a-x, 260a-x shall be discussed with respect to left-side NDM node 240a.

In various embodiments, each connected pair of nodes (left-side/right-side) can be connected over a single wavelength (i.e., one lane bandwidth). In such embodiments, NDM node 240a can comprise an electrical shuffle 204 connecting each left-side node L1-L4 to a left-side optical transceiver 202a (for example, as discussed in greater detail with respect to FIG. 4). Left-side electrical shuffle 204a comprises a plurality of electrical traces connecting a port of each left-side node L1-L4 to a 32-lane left-side optical transceiver 202a. In various embodiments, left-side electrical shuffle 204a can route each one of the eight electrical traces from a left-side node L1-L4 to a left-side optical transceiver 202a to create an ordered sequence. In various embodiments, left-side optical transceiver 202a may be configured to operate with respect to a four wavelength WDM optical fiber (i.e., 4λ-WDM optical fiber), among other types of WDM optical fibers capable of handling transmitting multiple wavelengths. In the illustrated embodiments, left-side optical transceiver 202a is configured to work with 4λ-WDM optical fibers, generating eight 4-lane, ordered sequences of the electrical lanes from left-side nodes L1-L4. In other embodiments, left-side optical transceiver 202a can be configured to work with optical fibers cable of handling more or fewer wavelengths. In various embodiments, left-side optical transceiver 202a can comprise a plurality of converters 360, each converter 360 comprising four electrical lanes (not shown in FIG. 2; discussed with respect to FIG. 3 below). The multiplexed signal will have a specific order based on the order with which the four electrical lanes are connected to a converter 360 (not shown in FIG. 2). In various embodiments, right-side optical transceivers 202b can be similar to left-side optical transceivers 202a, including a plurality of converters 360 configured in a similar manner to the converters 360 of left-side optical transceiver 202a discussed with respect to FIG. 3.

Left-side optical transceiver 202a can be connected to a left-side fiber shuffle 206a by a plurality of transceiver fibers. In various embodiments, left-side fiber shuffle 206a can be configured to route each ordered sequence signal from left-side optical transceiver 202a to a respective left-side NDM connector 208a-x. Each output fiber of left-side optical transceiver 202a can accept a 4λ wavelength ordered sequence optical signal from each converter 360. Based on the configuration of left-side electrical shuffle 204a, left-side optical transceiver 202a can assign a wavelength of the WDM wavelength set to an electrical lane in the order received, regardless of the source left-side node L1-L4. Therefore, each node is capable of transmitting and receiving signals using any of the four wavelengths in the WDM wavelength set. This shuffle shall be discussed in greater detail with respect to FIG. 3. In this way, each left-side NDM connector 208a-x is provided with an ordered sequence of optical signals based on the shuffle of electrical lanes performed between left-side nodes L1-L4 and left-side optical transceiver 202a and the shuffle of optical signals performed by left-side fiber shuffle 206a. Each left-side NDM node 240a-x can include a plurality of left-side NDM connectors 208a-x, where the number of left-side NDM connectors 208a-x is the same as the total number of right-side NDM nodes 260a-x in system 200. Accordingly, each left-side NDM node 240a-x can be connected to all of right-side NDM nodes 260a-x. Similarly, each right-side NDM node 260a-x can include a plurality of right-side NDM connectors 298a-x, with the number of right-side NDM connectors 298a-x being the same as the total number of left-side NDM nodes 240a-x in system 200.

By utilizing left-side fiber shuffle 206a, system 200 is capable of performing the node-division multiplexing by combining a lane from each left-side node L1-L4 onto each fiber of left-side NDM connectors 208a-x. In various embodiments, each left-side NDM connector 208a-x of NDM node 240a is configured to connect NDM node 240a with a right-side NDM connector 298 of each right-side NDM node 260a-n, creating the overall pseudo all-to-all connected system among NDM node 240a on the left side of system 200 and NDM nodes 260a-n on the right side of system 200. For example, as illustrated in FIG. 2, left-side NDM connector 208a can connect left-side nodes L1-L4 to right-side nodes R1-R4 through right-side NDM connector 298a of right-side NDM node 260a over NDM cable 280a, left-side NDM connector 208b can connect left-side nodes L1-L4 to right-side nodes R5-R8 through right-side NDM connector 298a of right-side NDM node 260b over NDM cable 280b, and so on. In various embodiments a plurality of left-side NDM nodes 240a-n can be grouped such that a single parallel-fiber (e.g., ribbon) cable can be used to connect the plurality of left-side NDM nodes 240a-n with a plurality of right-side NDM nodes 260a-x.

As shown, system 200 can be composed of a plurality of NDM nodes 240a-x, 260a-x, each comprising a plurality of M-sets of nodes. Each NDM nodes 240a-x, 260a-x comprises a plurality of NDM connectors 208a-x. Each wavelength in an NDM connector 208a-x is assigned to one of the nodes within the M-sets of nodes comprising a NDM nodes 240a-x, 260a-x. In this way, each node within NDM nodes 240a-x, 260a-x can communicate with right-side nodes 220 of an NDM node 260a-n, 260a-n on the right side through a left-side NDM connector 208a-x of NDM node 240a-x. By using NDM in this way, the full set of WDM wavelengths can be used over each fiber for plurality of nodes where a node only uses a subset of the WDM wavelength set. By implementing embodiments of the present disclosure, a single NDM cable can be used for many-to-many connection between two sets of nodes. As shown in FIG. 2, a single NDM cable 280a can connect left-side nodes L1-L4 of left-side NDM node 240a (in a many-to-many manner) to right-side nodes R1-R4 of right-side NDM node 260a, while a second NDM cable 280b can connect the same left-side nodes L1-L4 (in a many-to-many manner) to right-side nodes R5-R8 of right-side NDM node 260b. In this way, through the use of multiple NDM cables, each set of nodes within an NDM node can be connected to multiple sets of nodes in an opposite-side NDM node of the system, simplifying pseudo all-to-all connectivity, reducing the cost associated with pseudo all-to-all connectivity, and making installation/servicing faster and more efficient.

Figure 3:
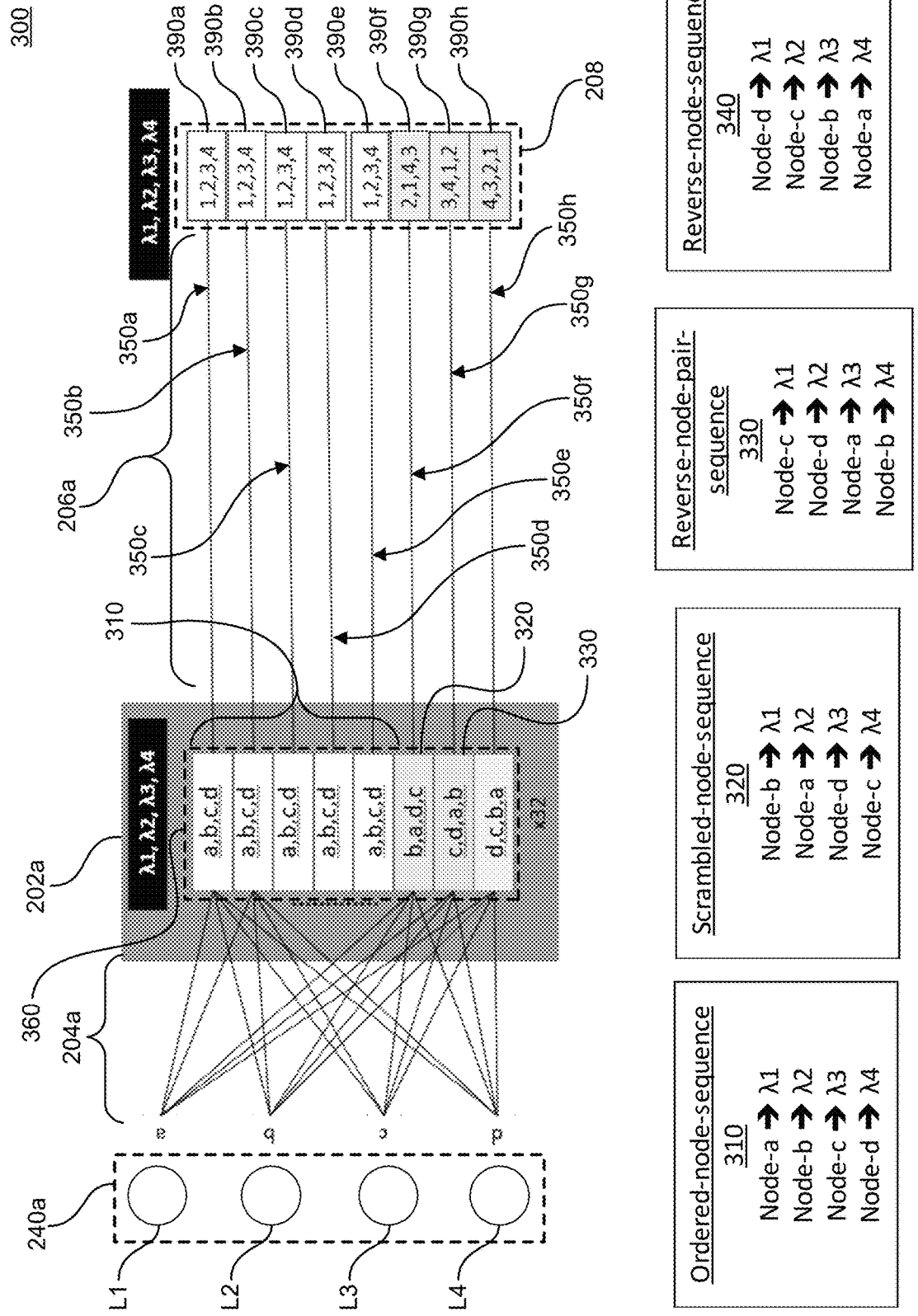
FIG. 3 shows an example electrical shuffle in accordance with embodiments of the technology disclosed herein.
Figure 4:
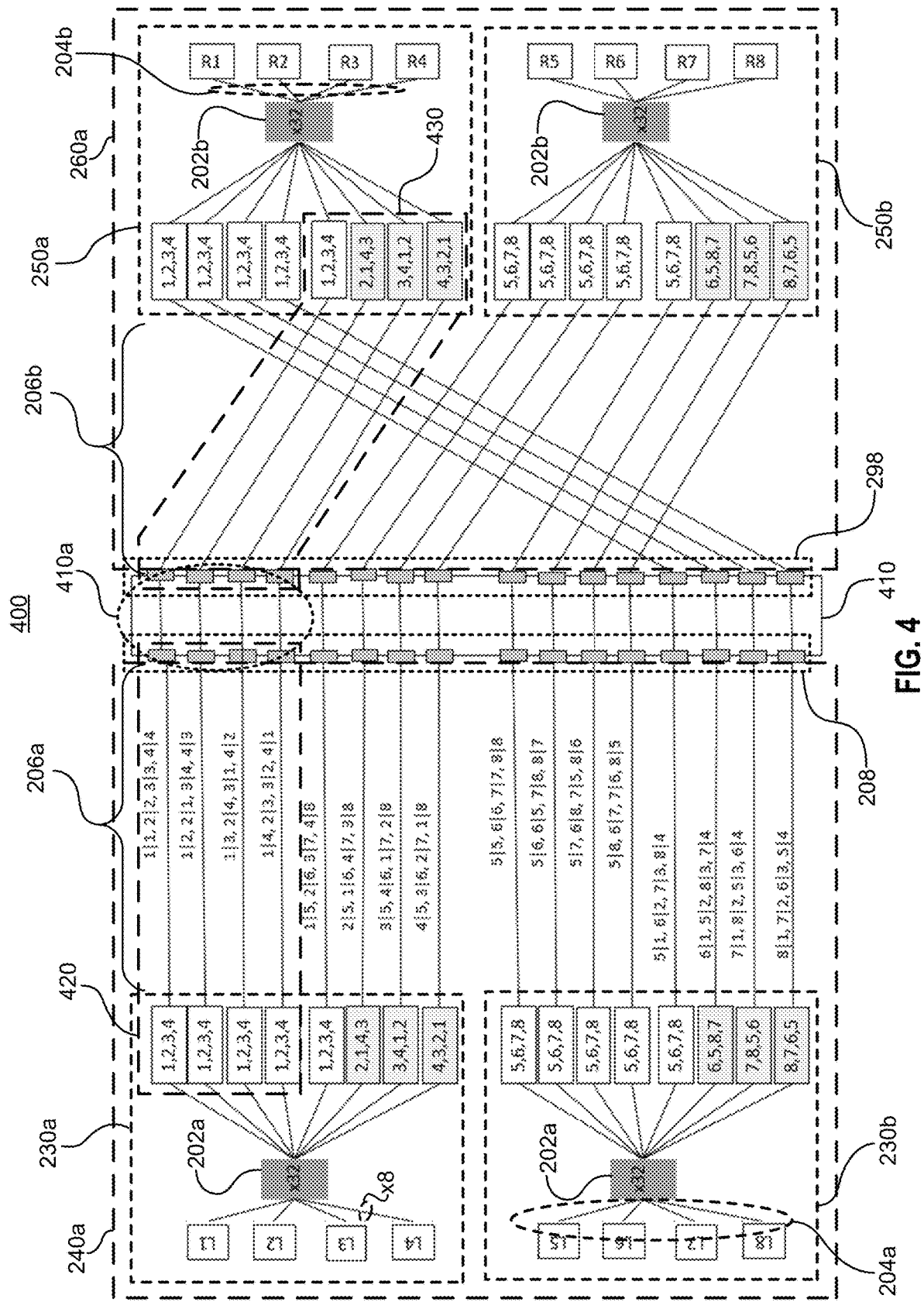
FIG. 4 shows an example system connecting a total of 16 nodes together in pseudo all-to-all connectivity in accordance with embodiments of the technology disclosed herein.

The two stage shuffling of embodiments of the present disclosure each serve a different purpose in providing pseudo all-to-all connectivity. FIG. 3 shows an example left-side shuffle of electrical lanes and optical shuffle 300 in accordance with embodiments of the technology disclosed herein. In various embodiments, the example electrical shuffle 300 can be implemented in left-side electrical shuffle 204a and left-side fiber shuffle 206a discussed with respect to FIG. 2. Although discussed with respect to a left-side implementation, the example shuffle of electrical lanes performed by left-side electrical shuffle 204a can be the same as the shuffle of electrical lanes performed by a right-side electrical shuffle 204b implemented on the right side of an optical system, such as the mirrored structure and operation discussed above with respect to FIG. 2. The optical shuffle discussed with respect to left-side fiber shuffle 206a, however, may not be the same as the optical shuffle performed by right-side fiber shuffle 206b. As shown in FIG. 4, right-side fiber shuffle 206b can comprise cross-connect fiber routing, wherein each optical fiber of right-side fiber shuffle 206b does not straight connect a converter of right-side optical transceiver 202b to a corresponding optical fiber of an NDM cable (discussed in greater detail below with respect to FIG. 4).

FIG. 3 is provided for illustrative purposes only, and is discussed with respect to a 32 lane left-side optical transceiver 202a transmitting (or receiving) eight multiplexed ordered sequence optical signals. The discussion of the electrical shuffling is applicable to right-side electrical shuffles 204b. As shown in FIG. 3, left-side electrical shuffle 204a routes an electrical lane from each left-side node L1-L4 to one of eight EO converters 360 of left-side optical transceiver 202a. Left-side optical transceiver 202a of FIG. 3 operates on four wavelengths $\lambda 1$, $\lambda 2$, $\lambda 3$, $\lambda 4$. Left-side optical shuffle 204a routes each electrical lane from left-side nodes L1-L4 to one of the EO converters 360 in a specific sequence. Each EO converter 360 outputs a multiplexed signal onto a WDM optical fiber.

For ease of reference, FIG. 3 is shown illustrating only one direction, i.e., transmission. In this case, each EO converter 360 can be associated with a vertical cavity surface emitting laser (VCSEL) or other light source used in the art as the transmission portion of left-side optical transceiver 202a. For receiving, a similar arrangement as shown in FIG. 3 would be included, flowing in the opposite direction. For example, a second set of EO converters 360 would be included, connected to a second set of eight fibers (in this case, eight fibers having a receive polarity) and configured to serve as the receiving portion of left-side optical transceiver 202a. That is, each EO converter 360 of this second (receive) set can be associated with a photo detector or other receiving device used in optical communication systems.

FIG. 3 shows left-side electrical shuffle 204a routing each electrical lane from left-side nodes L1-L4 to form four different ordered sequences 310-340. For ease of discussion, each left-side node L1-L4 will be referred to be a generic letter: node-a for L1; node-b for L2; node-c for L3; node-d for L4. As shown, in various embodiments five converters 360 of the plurality of EO converters 360 comprising left-side optical transceiver 202a can receive an electrical lane in an ordered node sequence 310, with node a modulated on wavelength $\lambda 1$, node b modulated on wavelength $\lambda 2$, node c modulated on wavelength $\lambda 3$, and node d modulated on wavelength $\lambda 4$. Another EO converter 360 of left-side optical transceiver 202a can receive one electrical lane in a scrambled node sequence 320. In various embodiments, scrambled node sequence 320 can comprise switching the positioning of the electrical trace for each node relative to ordered node sequence 310. In the illustrated example, node b and node a switch positions, with node b being modulated on wavelength $\lambda 1$ and node a being modulated on wavelength $\lambda 2$. In addition, node d and node c switch positions, with node d being modulated on wavelength $\lambda 3$ and node c being modulated on wavelength $\lambda 4$. Another EO converter 360 can be configured such that the multiplexed signal is ordered in accordance with reverse node pair sequence 330. In reverse node pair sequence 330, the position of each node pair (i.e., node-a|node-b, node-c|node-d) is switched, rather than switching the position of nodes within each node pair as discussed with respect to scrambled node sequence 320. As shown in FIG. 3, reverse node pair sequence 330 multiplexes node c on wavelength $\lambda 1$, node d on wavelength $\lambda 2$, node a on wavelength $\lambda 3$, and node b on wavelength $\lambda 4$. Another converter 360 can be configured to multiplex the nodes in a reverse node sequence order 340, wherein node d is multiplexed on wavelength $\lambda 1$, node c is multiplexed on wavelength $\lambda 2$, node b is multiplexed on wavelength $\lambda 3$, and node a is multiplexed on wavelength $\lambda 4$.

Each EO converter 360 outputs (or receives) a multiplexed signal on a $4\lambda$-WDM fiber, resulting in different $4\lambda$-WDM fibers 350a-h of left-side fiber shuffle 206a having different orders of signals from left-side nodes L1-L4 on each fiber 390a-h of left-side NDM connector 208. In various embodiments, left-side fiber shuffle 206a can comprise a straight fiber shuffle, wherein each $4\lambda$-WDM fibers 350a-h is routed straight through (i.e., straight across to a corresponding position of left-side NDM connector 208). In other words, the converter 360 in a first position of left-side optical transceiver 202a connects straight through to optical fiber 390a in a first position of left-side NDM connector 208. As shown, ordered node sequence 310 travels on $4\lambda$-WDM fibers 350a-e, such that left-side node L1 is on wavelength $\lambda 1$, left-side node L2 on wavelength $\lambda 2$, left-side node L3 on wavelength $\lambda 3$, and left-side node L4 on wavelength $\lambda 4$. Scrambled node sequence 320 travels on $4\lambda$-WDM fibers 350f such that left-side node L2 is on wavelength $\lambda 1$, left-side node L1 on wavelength $\lambda 2$, left-side node L4 on wavelength $\lambda 3$, and left-side node L3 on wavelength $\lambda 4$. Reverse node pair sequence 330 travels on $4\lambda$-WDM fibers 350g such that left-side node L3 is on wavelength $\lambda 1$, left-side node L4 on wavelength $\lambda 2$, left-side node L1 on wavelength $\lambda 3$, and left-side node L2 on wavelength $\lambda 4$. Reverse node sequence 340 travels on $4\lambda$-WDM fibers 350h such that left-side node L4 is on wavelength $\lambda 1$, left-side node L3 on wavelength $\lambda 2$, left-side node L2 on wavelength $\lambda 3$, and left-side node L1 on wavelength $\lambda 4$.

FIG. 4 shows an example system 400 connecting a total of 16 nodes together in pseudo all-to-all connectivity in accordance with embodiments of the technology disclosed herein. Each left-side node L1-L8 connection to each right-side node R1-R8 is one wavelength in the example system 400 (as illustrated in electrical shuffle 300 discussed with respect to FIG. 3), such that each wavelength of a fiber in left-side fiber shuffle 206a includes a path for each node in the respective NDM node. As shown in FIG. 4, left-side fiber shuffle 206a is a straight-through fiber shuffle, wherein the ordered sequence fibers from left-side optical transceiver 202a route to the corresponding optical fiber position of left-side NDM connector 208 (i.e., first fiber of a first converter 360 connected to a first optical fiber of left-side NDM connector 208, second fiber of a second converter 360 connected to a second optical fiber of left-side NDM connector 208, etc.). In the illustrated embodiment, the optical fibers associated with M-sets of left-side nodes 230a, 230b are grouped into a straight 32 fiber NDM cable 410, allowing a single cable to connect many-to-many a total of 16 nodes (i.e., 8 left-side nodes, 8 right-side nodes). The number of nodes which may be connected is provided for illustrative purposes only. In other embodiments, a different number of nodes on each side of the system may be connected (e.g., 16 left-side nodes|16 right-side nodes, 32 left-side nodes|32 right-side nodes, etc.). In various embodiments, NDM cable 410 can comprise an off the shelf 32 fiber optical cable—16 fibers for transmit signals and 16 fibers for receive signals. As shown, the shuffle required for NDM is performed by left-side electrical shuffle 204a, right-side electrical shuffle 204b, left-side fiber shuffle 206a (i.e., straight-through fiber shuffle), and right-side fiber shuffle 206b (i.e., cross-connect fiber shuffle). Therefore, COTS optical cables can be used to minimize cable count to simplify the installation and to reduce the cost of implementing the technology disclosed herein. Prior art solutions would require 64 2-fiber duplex cables (instead of one 32-fiber cable) to achieve the same fully-connected solution between 8 left-side nodes and 8 right-side nodes, and 64

2-lane (instead of two 32-lane) optical transceivers on each side, i.e., 64 times numbers of cables and optical transceivers that will incur higher cost and in turn would require larger systems to accommodate for optical cable connector and transceiver space. Each fiber of left-side fiber shuffle 206a and right-side fiber shuffle 206b in FIG. 4 represents a fiber pair (i.e., a transmit fiber and a receive fiber). In this way, full duplex communication between M-set of left-side nodes 230a and M-set of right-side nodes 250a is accomplished over eight WDM fibers of NDM cable 410.

In various embodiments, each left-side node L1-L8 and corresponding left-side optical transceiver 202a comprising converters 360 may be disposed within a node tray installed in the front of a blade chassis. Each node tray may contain one or more four-node or eight-node groups in various embodiments. As a non-limiting example, a first node tray in a first blade chassis may represent the left side of a system (e.g., left side of system 400) and a second node tray in a second blade chassis may represent the right side of a system (e.g., right side of system 400). A plurality of interconnect trays may be disposed on the rear of the blade chassis, each interconnect tray comprising a plurality of interconnect bays, each interconnect bay configured to connect to each node tray installed in the blade chassis. Each interconnect tray can comprise a left-side fiber shuffle 206a or right-side fiber shuffle 206b discussed with respect to FIG. 4 (depending on the side of the optical system in which the fiber shuffle is implemented), and provide the optical routing to provide the pseudo all-to-all connectivity between the first blade chassis and the second blade chassis discussed herein. In various embodiments, the first blade chassis and the second blade chassis may be implemented within the same equipment rack.

As discussed above, left-side electrical shuffle 204a routes each electrical lane from left-side nodes L1-L4 in a variety of ordered sequences. FIG. 4 shows how the ordered sequences enable pseudo all-to-all connectivity between M-sets of left-side nodes 230a, 230b and M-sets of right-side nodes 250a, 250b. As illustrated, a left-side sequence group 420 is connected to right-side sequence group 430 over a first fiber group 410a of NDM cable 410. In FIG. 4, each fiber of left-side fiber shuffle 206a, NDM cable 410, and right-side fiber shuffle 206b represents a fiber pair (i.e., a transmit fiber and a receive fiber). Each fiber of left-side sequence group 420 has the same sequence multiplexed on the fiber, here being the ordered node sequence 310 discussed with respect to FIG. 3. That is, L1 is associated with wavelength λ1, L2 is associated with wavelength λ2, L3 is associated with wavelength λ3, and L4 is associated with wavelength λ4. On the right side of system 400, right-side sequence group 430 includes one of each sequence of nodes discussed with respect to FIG. 3. In this way, each right-side node R1-R4 is modulated onto a different wavelength of the WDM wavelength set per connection. For example, R1 is associated with wavelength λ1 on a first fiber pair of the first fiber group 410a, R1 is associated with wavelength λ2 on a second fiber of the first fiber group 410a, R1 is associated with wavelength λ3 on a third fiber of the first fiber group 410a, and R1 is associated with wavelength λ4 on a fourth fiber of the first fiber group 410a. Each connected pair of left-side node/right-side node (Ln/Rn) on a given fiber pair. In FIG. 4, the Ln/Rn connections for connecting all left-side nodes L1-Ln and right-side nodes R1-Rn over the 32-fiber NDM cable 410 are arranged as follows (with the fiber pair number within indicated):

TABLE 1

Pseudo All-to-All Connections (one lane bandwidth)

L1-L4 ↔ R1-R4
(over 8 fibers) (First Fiber Group)

| 1 | L1 ↔ R1 | 3 | L1 ↔ R3 |
|---|---|---|---|
| 1 | L2 ↔ R2 | 3 | L2 ↔ R4 |
| 1 | L3 ↔ R3 | 3 | L3 ↔ R1 |
| 1 | L4 ↔ R4 | 3 | L4 ↔ R2 |
| 2 | L1 ↔ R2 | 4 | L1 ↔ R4 |
| 2 | L2 ↔ R1 | 4 | L2 ↔ R3 |
| 2 | L3 ↔ R4 | 4 | L3 ↔ R2 |
| 2 | L4 ↔ R3 | 4 | L4 ↔ R1 |

L1-L4 ↔ R5-R8
(over 8 fibers) (Second Fiber Group)

| 1 | L1 ↔ R5 | 3 | L1 ↔ R7 |
|---|---|---|---|
| 1 | L2 ↔ R6 | 3 | L2 ↔ R8 |
| 1 | L3 ↔ R7 | 3 | L3 ↔ R5 |
| 1 | L4 ↔ R8 | 3 | L4 ↔ R6 |
| 2 | L1 ↔ R6 | 4 | L1 ↔ R8 |
| 2 | L2 ↔ R5 | 4 | L2 ↔ R7 |
| 2 | L3 ↔ R8 | 4 | L3 ↔ R6 |
| 2 | L4 ↔ R7 | 4 | L4 ↔ R5 |

L5-L8 ↔ R5-R8
(over 8 fibers) (Third Fiber Group)

| 1 | L5 ↔ R5 | 3 | L5 ↔ R7 |
|---|---|---|---|
| 1 | L6 ↔ R6 | 3 | L6 ↔ R8 |
| 1 | L7 ↔ R7 | 3 | L7 ↔ R5 |
| 1 | L8 ↔ R8 | 3 | L8 ↔ R6 |
| 2 | L5 ↔ R6 | 4 | L5 ↔ R8 |
| 2 | L6 ↔ R5 | 4 | L6 ↔ R7 |
| 2 | L7 ↔ R8 | 4 | L7 ↔ R6 |
| 2 | L8 ↔ R7 | 4 | L8 ↔ R5 |

L5-L8 ↔ R1-R4
(over 8 fibers) (First Fiber Group)

| 1 | L5 ↔ R1 | 3 | L5 ↔ R3 |
|---|---|---|---|
| 1 | L6 ↔ R2 | 3 | L6 ↔ R4 |
| 1 | L7 ↔ R3 | 3 | L7 ↔ R1 |
| 1 | L8 ↔ R4 | 3 | L8 ↔ R2 |
| 2 | L5 ↔ R2 | 4 | L5 ↔ R4 |
| 2 | L6 ↔ R1 | 4 | L6 ↔ R3 |
| 2 | L7 ↔ R4 | 4 | L7 ↔ R2 |
| 2 | L8 ↔ R3 | 4 | L8 ↔ R1 |

Figure 5A:
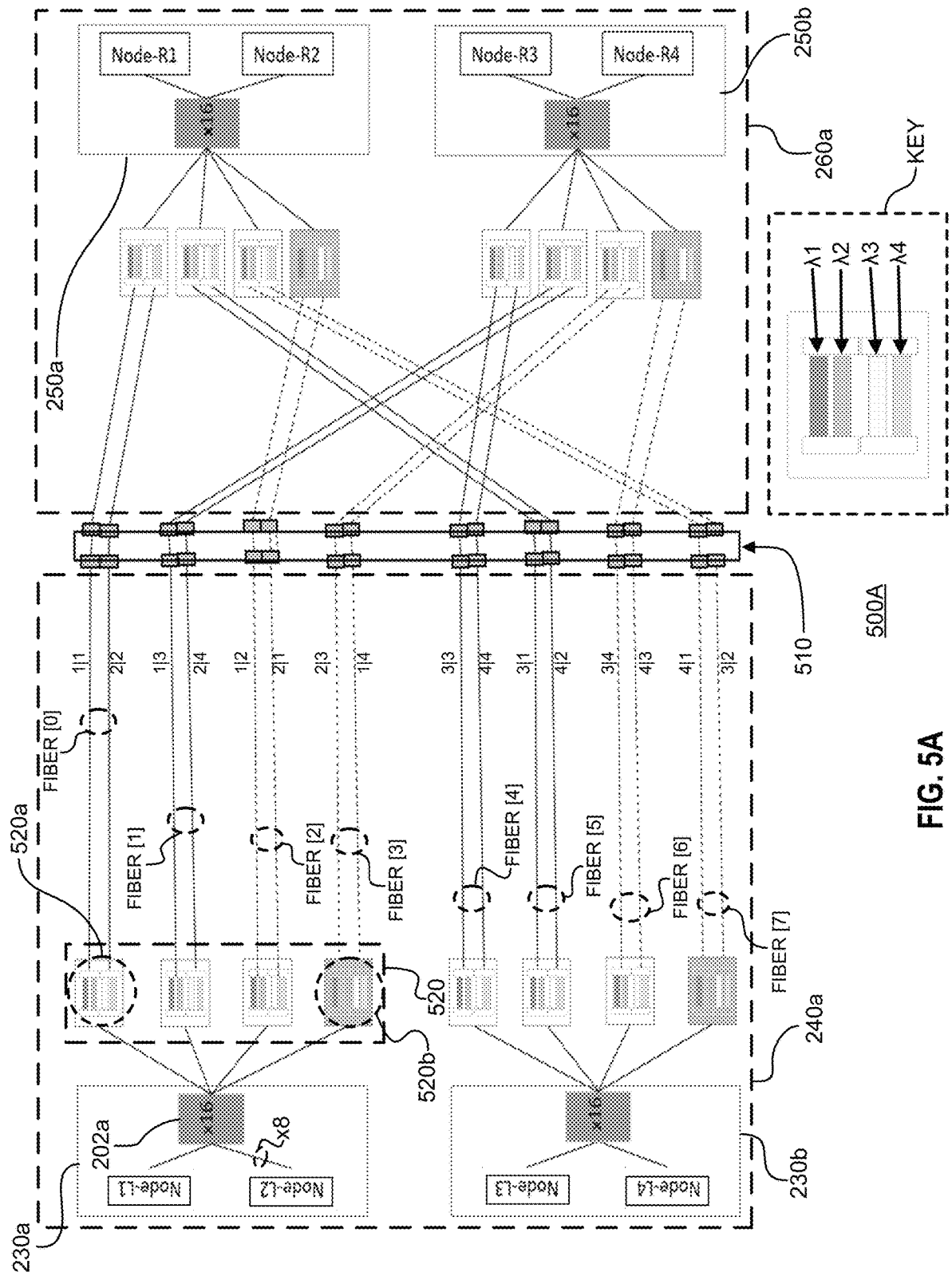
FIG. 5A illustrates another example system, where each pair of nodes is connected with two-lane bandwidth, in accordance with embodiments of the technology disclosed herein.

In the illustrated embodiments of FIG. 4, each left-side node L1-L8 is connected to each right-side node R1-R8 with one lane of bandwidth (i.e., one electrical lane mapped to one wavelength). In other words, left-side optical transceivers 202a have the same number of lanes as the sum of lanes from the nodes in the NDM node. As discussed with respect to FIG. 4, each left-side node L1-L8 comprises eight electrical lanes, resulting in a total of 32 electrical lanes, which is the same as the 32-lane left-side optical transceivers 202a where each optical lane is a transmit signal represented with a wavelength and a receive signal represented with the same wavelength. In other embodiments, higher bandwidth between node pairs can be achieved by increasing the number of electrical lanes and corresponding number of wavelengths used to connect nodes. FIG. 5A illustrates another example system 500A in accordance with embodiments of the technology disclosed herein, where each pair of nodes is connected with two-lane bandwidth (i.e., using two wavelengths between pairs of nodes). In such embodiments, each left-side optical transceiver 202a and right-side optical transceiver 202b comprises a 16-lane transceiver. Table 2 shows the mapping of node pairs connected using two wavelengths.

TABLE 2

Pseudo All-to-All Connections (two lane bandwidth)

| LEFT\|RIGHT Node # | ×2 port from LEFT Node #[P#] | Wave-length # | Blindmate fiber pair | Wave-length # | ×2 port from RIGHT Node #[P#] |
|---|---|---|---|---|---|
| 1\|1 | 1[1] | λ1 + λ2 | 1 | λ1 + λ2 | 1[1] |
| 1\|2 | 2[1] | λ3 + λ4 | 1 | λ3 + λ4 | 2[1] |
| 1\|3 | 1[2] | λ1 + λ2 | 2 | λ1 + λ2 | 3[2] |
| 2\|4 | 2[2] | λ3 + λ4 | 2 | λ3 + λ4 | 4[2] |
| 1\|2 | 1[3] | λ1 + λ2 | 3 | λ1 + λ2 | 2[3] |
| 2\|1 | 2[3] | λ3 + λ4 | 3 | λ3 + λ4 | 1[3] |
| 1\|4 | 1[4] | λ1 + λ2 | 4 | λ1 + λ2 | 4[4] |
| 2\|3 | 2[4] | λ3 + λ4 | 4 | λ3 + λ4 | 3[4] |
| 3\|3 | 3[1] | λ1 + λ2 | 5 | λ1 + λ2 | 3[1] |
| 4\|4 | 4[1] | λ3 + λ4 | 5 | λ3 + λ4 | 4[1] |
| 3\|1 | 3[2] | λ1 + λ2 | 6 | λ1 + λ2 | 1[2] |
| 4\|2 | 4[2] | λ3 + λ4 | 6 | λ3 + λ4 | 2[2] |
| 3\|4 | 3[3] | λ1 + λ2 | 7 | λ1 + λ2 | 4[3] |
| 4\|3 | 4[3] | λ3 + λ4 | 7 | λ3 + λ4 | 3[3] |
| 3\|2 | 3[4] | λ1 + λ2 | 8 | λ1 + λ2 | 2[4] |
| 4\|1 | 4[4] | λ3 + λ4 | 8 | λ3 + λ4 | 1[4] |

As shown in Table 2, each left-side node L1-L4 is connected to each right-side node R1-R4 utilizing two wavelengths (i.e., with two lanes of bandwidth). For example, left-side node L1 is connected to each of right-side nodes R1-R4 using wavelengths λ1, λ2. These connections are illustrated in FIG. 5A. As illustrated, system 500A includes left-side NDM node 240a (having a first M-set of left-side nodes 230a and a second M-set of left-side nodes 230b) and right-side NDM node 260a (having a first M-set of right-side nodes 250a and a second M-set of right-side nodes 250b). A 16-fiber NDM cable 510 connects the M-sets of left-side nodes 230a, 230b to the M-sets of right-side nodes 250a, 250b. For ease of discussion, system 500A is illustrated with only a single fiber (e.g., FIBER[0], FIBER [1], etc.) shown for each node-to-node connection in one signal direction. It should be assumed that each identified fiber (e.g., FIBER[0]) is representative of a transmit (or a receive) fiber. Two lines are shown for each FIBER[0]-[7], to clearly show how two-wavelength paths are connected between the left and the right nodes. For example, the first line of FIBER[0] connecting L1 and R1 represents wavelengths λ1, λ2 and the second line of FIBER[0] connecting L2 and R2 represents wavelengths λ3, λ4. Therefore, FIBER [0]-[7] as shown in FIG. 5A represents eight fibers. There will be 16 fibers in an NDM cable 510 for a full duplex communication between the M-set of left-side nodes 230a, 230b and the M-sets of right-side nodes 250a, 250b.

To provide two-lane bandwidth, two ports of each node is used to connect a left-side node and a right-side node (e.g., left-side node L1|right-side node R1). Each left-side optical transceiver 202a and right-side optical transceiver 202b represents a 16-lane transceiver, capable of multiplexing and demultiplexing four optical signals into the 16 individual lanes for all of the nodes of the respective M-set of left-side nodes 230a,230b and M-set of right-side nodes 250a, 250b. As shown in the key of FIG. 5A, each wavelength λ1, λ2, λ3, λ4 is arranged in a set order, similar to the wavelength ordering discussed with respect to FIG. 3. The position of each wavelength of the WDM wavelength set remains the same, with the ordered sequencing being accomplished by shuffling the order of the electrical traces being connected to a given EO converter of left-side optical transceiver 202a and right-side optical transceiver 202b. As a non-limiting example, FIBER[0] is shown as comprising wavelengths λ1, λ2 path assigned to connect the left-side node L1 and right-side node R1, and wavelengths λ3, λ4 path assigned to connect the left-side node L2 to right-side node R2. FIBER [0] is a physical fiber for a transmit or a receive signal direction. Two of FIBER[0] will be used for bidirectional full-duplex signals.

Similar to the example discussed with respect to FIG. 3, system 500A includes different types of ordered sequences to ensure pseudo all-to-all connectivity between nodes on the left side of system 500A and nodes on the right side. With respect to M-set of left-side nodes 230a, the EO converters of left-side optical transceiver 202a result in different ordered sequences 520, a straight-mapped sequence 520a and a reverse-mapped sequence 520b. Because two-lanes of bandwidth are utilized for each node-to-node connection, straight-mapped sequence 520a and reverse-mapped sequence 520b only include multiplexed WDM optical signals comprising the nodes of a corresponding M-set of nodes. In the illustrated example, straight-mapped sequence 520a comprises electrical traces from a first node (e.g., left-side node L1, or left-side node L3) mapped to the first two wavelengths (wavelengths λ1 and λ2) and electrical traces from a second node (e.g., left-side node L2, or left-side node L4) mapped to the last two wavelengths (wavelength λ3 and λ4). The reverse-mapped sequence 520b flips the order of nodes associated with each pair of wavelengths (i.e., left-side node L1 being associated with wavelengths λ3, λ4, left-side node L2 being associated with wavelengths λ1, λ2). Including the reverse-mapped sequence enables the first M-set of left-side nodes (i.e., left-side nodes L1, L2) to be connected to the second M-set of right-side nodes (i.e., right-side nodes R3, R4). As shown, each fiber FIBER[0]-FIBER[7] provide a node-to-node connection between each left-side node L1-L4 to each right-side node R1-R4. Accordingly, a single 16-fiber cable, such as NDM cable 510, can interconnect all left-side nodes L1-L4 to all right-side nodes R1-R4 for full duplex communication.

In various embodiments, additional NDM nodes 240b-n, 260b-n can be added to system 500A, increasing the scale of the system. In some embodiments, NDM nodes may be added symmetrically, meaning that for each additional left-side NDM node 240 and corresponding right-side NDM node 260 is added. In other embodiments, NDM nodes may be added asymmetrically, with either a left-side NDM node 240 or a right-side NDM node 260 added to the system. As illustrated in FIG. 2, each NDM node can be connected to a different NDM node over a separate cable connection. To add an additional NDM nodes, the number of ports for each node (e.g., left-side nodes L1-Ln, right-side nodes R1-R2) can be doubled, and a second level of electrical shuffles 204a, 204b, optical transceivers 202a, 202b, and fiber shuffles 206a, 206b can be added to the system. In various embodiments, doubling the ports for each node may comprise adding additional blade servers to a blade chassis. In other embodiments, doubling the ports could comprise increasing the size of each node tray to accommodate a greater number of nodes (e.g., a 4-node tray to an 8-node tray).

Figure 5B:
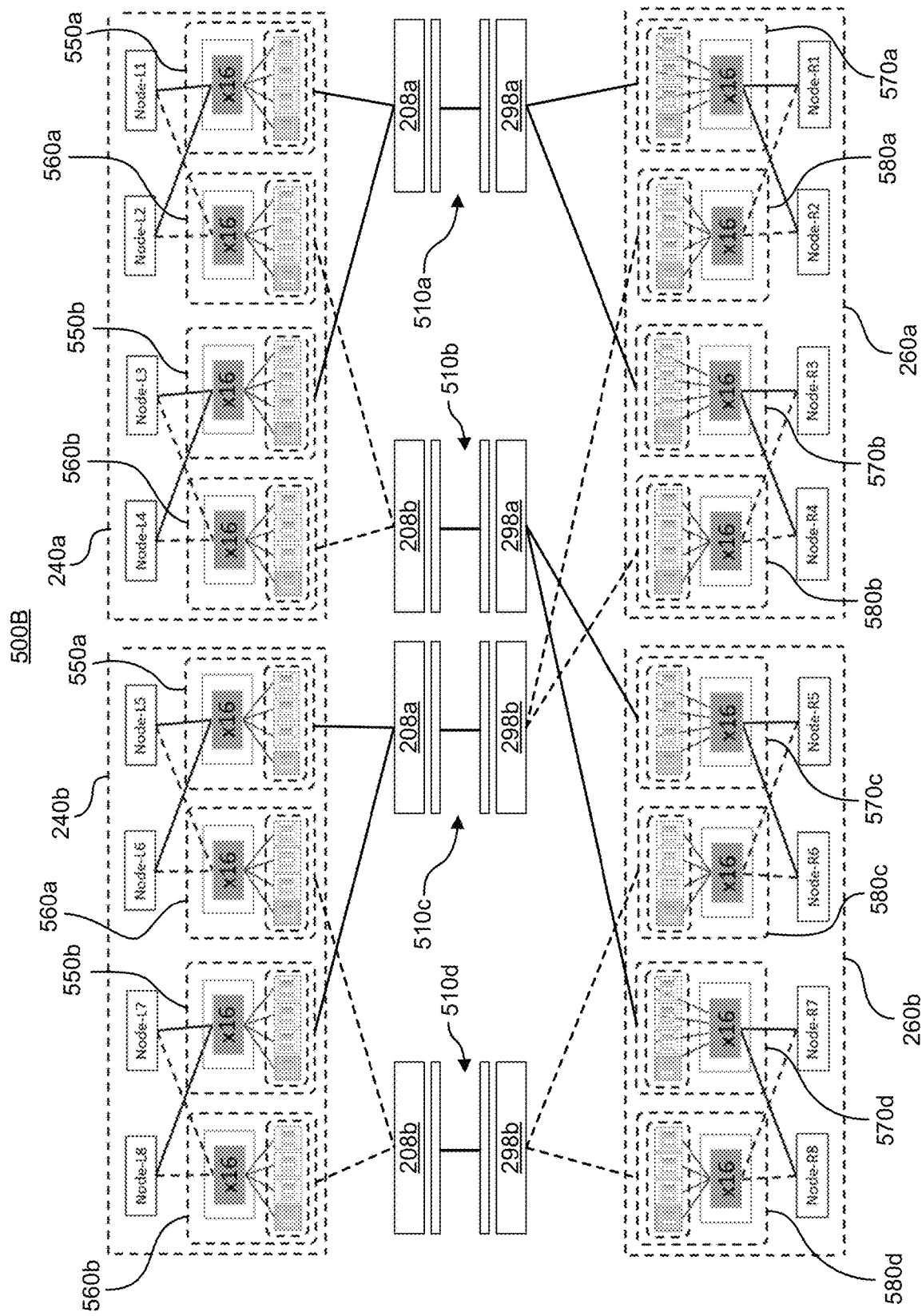
FIG. 5B illustrates an example scaled-version of the example system of FIG. 5A in accordance with embodiments of the technology disclosed herein.

FIG. 5B illustrates a two-lane bandwidth system 500B for connecting a total of eight left-side NDM nodes L1-L8 and eight right-side nodes R1-R8. For ease of illustration, FIG. 5B is a 90-degree clockwise rotation with respect to FIG. 5A, and thus the left-side NDM nodes 240a, 240b are in the top row and the right-side NDM nodes 260a, 260b are in the bottom row. System 500B is conceptually similar to doubling the node count of system 500A. To accomplish this doubling of the connected node count, multiple input/output (I/O) cards can be associated with each pair of nodes within an NDM node (e.g., left-side nodes L1 and L2). As shown, left-side NDM node 240a includes four I/O cards, two primary I/O cards 550a, 550b and two secondary I/O cards 560a, 560b. Primary I/O cards 550a, 550b and secondary I/O cards 560a, 560b can comprise a separate 16-lane left-side optical transceiver 202a and a separate left-side electrical shuffle configured to route electrical traces from each node within a given NDM node to create an ordered sequence with an associated left-side optical transceiver 202a. Although only two I/O cards are shown, the node count within system 500B can be increased by adding additional secondary I/O cards for each node pair within an NDM node. Each primary I/O card 550a, 550b can be combined into a single left-side NDM connector 208a of left-side NDM node 240a, and secondary I/O card 560a, 560b can be combined into a different left-side NDM connector 208b of left-side NDM node 240a. An NDM cable 510a, 510b can be used to connect left-side NDM connector 208a, 208b of left-side NDM node 240a to right-side NDM connectors 298a respectively. In various embodiments, NDM cables 510a, 510b, can be similar to the 16-fiber NDM cable 510 discussed with respect to FIG. 5A. The addition of secondary I/O cards (e.g., secondary I/O cards 560a, 560b) can be performed for left-side NDM node 240b, and similar I/O cards can be included in right-side NDM nodes 260a, 260b, as shown in FIG. 5B. As shown, left-side NDM node 240b can include two primary I/O cards 550a, 550b (one each for node pairs L5|L6 and L7|L8, respectively) as well as two secondary I/O cards 560a, 560b (one each for node pairs L5|L6 and L7|L8, respectively). Primary I/O cards 550a, 550b of left-side NDM node 240b can be connected to left-side NDM connector 208a of left-side NDM node 240b, whereas secondary I/O cards 560a, 560b of left-side NDM node 240b can be connected to left-side NDM connector 208b of left-side NDM node 240b. NDM cables 510c, 510d can be used to connect left-side NDM connectors 208a. 208b of left-side NDM node 240b to right-side NDM connectors 298b of right-side NDM connectors 260a, 260b, respectively. As another NDM node is added, an additional I/O card (i.e., secondary I/O cards 560n) can be added to each currently implemented NDM node to increase the number of ports available.

As shown in FIG. 5B, each NDM cable 510a-d enables the nodes within a left-side NDM node to be connected in a many-to-many manner to the nodes within each right-side NDM node. In the illustrated embodiment, left-side nodes L1-L4 can be many-to-many connected to right-side nodes R1-R4 over NDM cable 510a, and left-side nodes L1-L4 can also be many-to-many connected to right-side nodes R5-R8 over NDM cable 510b. What would require a larger number of individual, point-to-point connections between the different left-side nodes L1-L4 and the right-side nodes R1-R8 in a conventional setup is accomplished through the use of two NDM cables 510a, 510b. In this way, connecting in a pseudo all-to-all way is made faster, cheaper, and simpler through the reduction of the overall number of faceplate connectors required. Moreover, by utilizing node division multiplexing, the embodiments discussed herein increases the efficiency of the pseudo all-to-all communication by enabling all of the bandwidth of an optical fiber to be available even where a particular node is not fully utilizing the bandwidth, allowing another node multiplexed onto the same optical fiber to utilize the bandwidth.

Figure 6A:
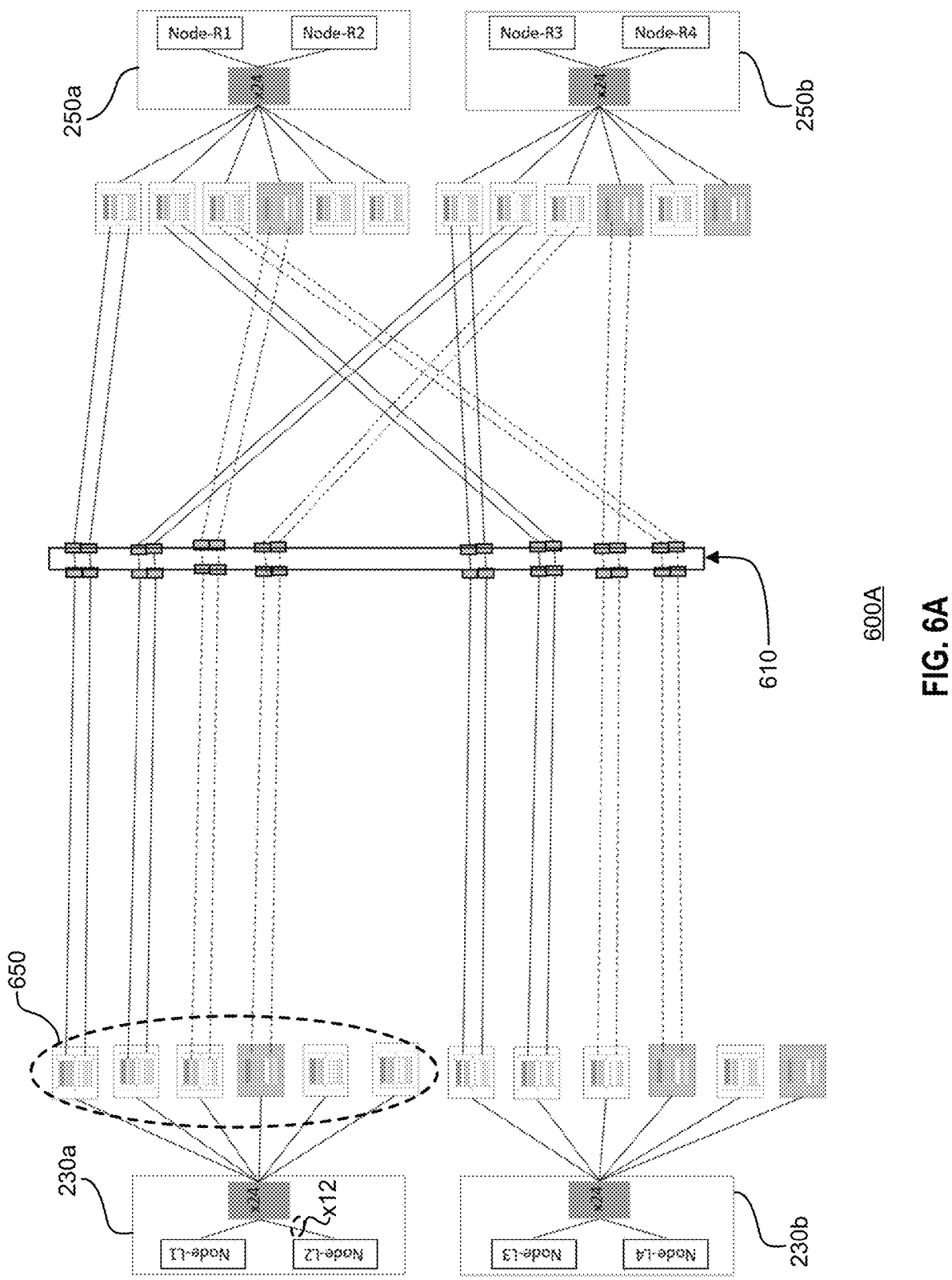
FIG. 6A illustrates another example system having a mismatched number of optical transceiver lanes to nodes in accordance with embodiments of the technology disclosed herein.

In various embodiments, the number of ports of a node may result in a greater number of potential connections than available nodes within a pair of NDM nodes. FIG. 6A illustrates an example system 600A in accordance with embodiments of the present disclosure showing a mismatch between optical transceiver lanes and available nodes of an NDM node. As with all figures, descriptions regarding common references between figures should be interpreted as applying equally to all uses of such common references unless explicitly stated to the contrary. As shown in FIG. 6A, each left-side node L1-L4 and right-side node R1-R4 has 12 ports (e.g., 12 electrical traces) connecting each node with a corresponding optical transceiver 202. Accordingly, each left-side optical transceiver 202a comprises a 24-lane optical transceiver, capable of generating six multiplexed WDM optical signals (represented by signal group 650). A similar configuration can be used for right-side optical transceiver 202b. Therefore, a total of twelve different multiplexed WDM signals are generated per four nodes. As discussed with respect to FIG. 5A, each left-side node-to-right-side node can be connected with a single multiplexed WDM signal (as a fiber pair), all nodes being connected over a 16-fiber WDM cable 610. Therefore, as shown in FIG. 6A, system 600A includes an extra two multiplexed signals per M-set of left-side nodes 230a, 230b, or per M-set of right-side nodes 250a, 250b.

Figure 6B:
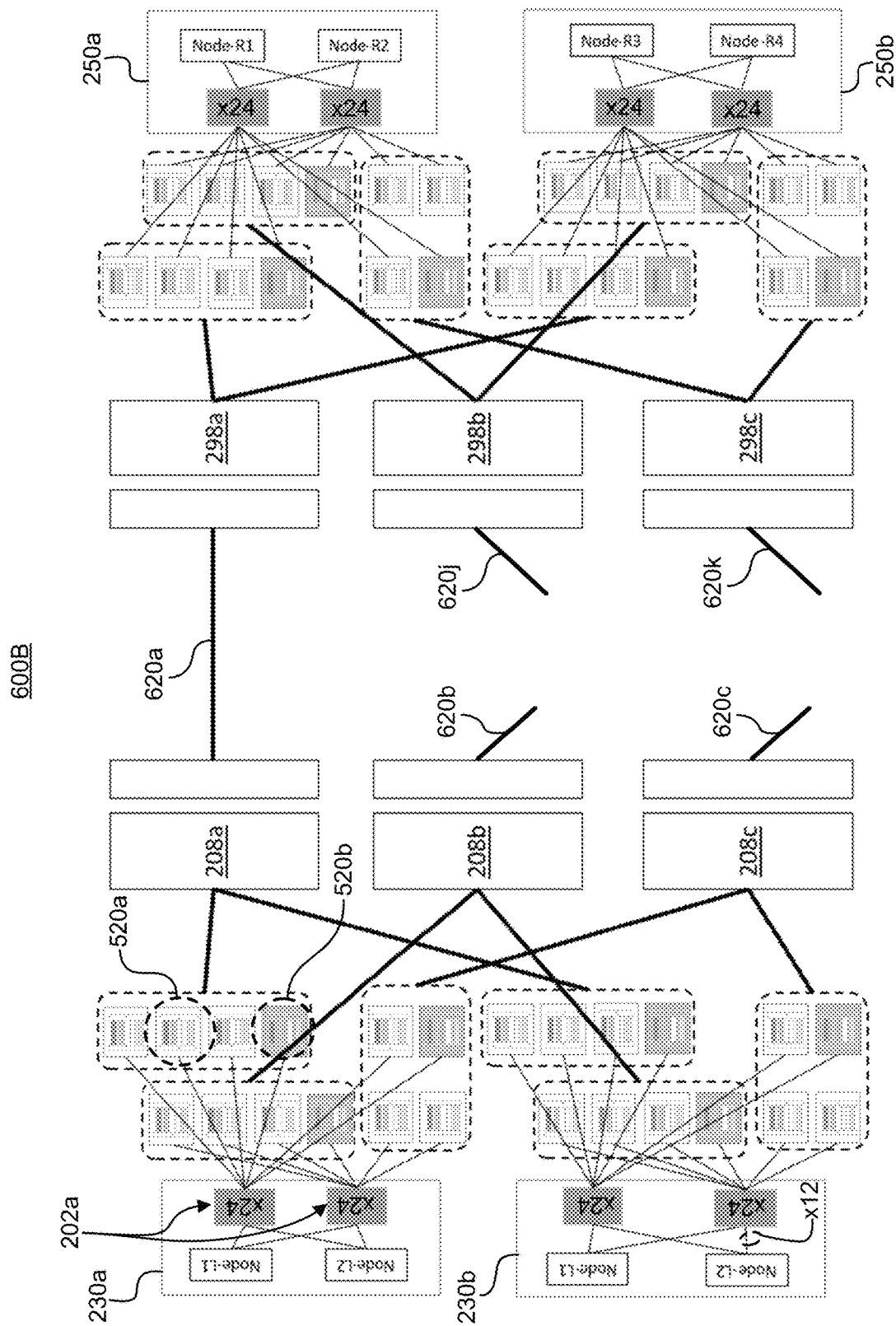
FIG. 6B illustrates an example connection of the system of FIG. 6B having a mismatched number of optical transceiver lanes to nodes in accordance with embodiments of the technology disclosed herein.

In various embodiments, in situations where there is a mismatch between total number of multiplexed WDM signals and nodes, an additional 24-lane left-side optical transceiver 202a can be added to each M-set of left-side nodes 230a, 230b, or an additional 24-lane right-side optical transceiver 202b can be added to each M-set of right-side nodes 250a, 250b. FIG. 6B shows another optical transceiver lane mismatch system 600B in accordance with embodiments of the present disclosure. Additional ports can be added in a similar manner as that discussed with respect to FIG. 5B. As illustrated in FIG. 6B, a first left-side optical transceiver 202a can connect four multiplexed WDM signals to a first NDM cable 620a, a second left-side optical transceiver 202a can connect four multiplexed WDM signals to a second NDM cable 620b, and the remaining two WDM signals from the first and second left-side optical transceivers 202a of each M-set of left-side nodes 230a, 230b are combined into a third NDM cable 620c. Therefore, in this way, all four left-side nodes L1-L4 are connected to a left-side NDM connector 208a, four right-side nodes R1-R4 are connected to a right-side NDM connector 298a, and four left-side nodes L1-L4 and right-side nodes R1-R4 are connected together through an NDM cable 620a. NDM cables 620b, 620c may be used to connect four left-side nodes L1-L4 to additional right-side node groups. Similarly, NDM cables 620j, 620k may be used to connect four right-side nodes R1-R4 to additional left-side node groups.

To accomplish the connection illustrated in FIG. 6B, a first 24-lane optical transceiver 202a, 202b of an M-set of nodes (e.g., M-set of left-side nodes 230a) can create five straight-mapped sequences 520a and one reverse-mapped sequence 520b, while the other 24-lane optical transceiver 202a, 202b of the M-set of nodes can create four straight-mapped sequences 520a and two reverse-mapped sequences 520b. In this way, a full complement of ordered sequences (i.e., three straight-mapped sequences 520a and one reverse-mapped sequence 520b as discussed with respect to FIG. 5A) can be created for use with the third NDM cable 620c.

Throughout all of the embodiments discussed herein, similar components have been described as operating in the same manner regardless of the side of the system in which that component is positioned. For example, right-side optical transceivers 202b on the right side of a given example system can operate in the same manner than left-side optical transceivers 202a. The same is true of the right-side electrical shuffles 204b. By designing components to be interchangeable on the left side or right side of a system reduces the overall cost of the system by minimizing the amount of design and specialized construction necessary. Moreover, scaling the system is more cost effective due to the ability to more easily produce extra components from the same mold. For example, excluding the fiber shuffles 206a, 206b (discussed with respect to FIG. 2), the same optical transceiver, electrical shuffle, or node can be used as either a left side component or a right side component of a system. To reduce the complexity and overall cost of fiber shuffles 206a, 206b, embodiments of the present disclosure utilize a left-side-specific fiber shuffle 206a and a right-side-specific fiber shuffle 206b. Referring to FIG. 2, left-side-specific fiber shuffles 206a can be constructed as a straight pass-through fiber shuffle as illustrated in example system 200. By designing the system such that ordered sequences are created by shuffling the electrical traces prior to optical conversion within optical transceiver 202, embodiments of the present disclosure limit the complexity of installing and servicing the system. In other words, a single printed circuit board (PCB) design can be utilized for each left-side node L1-Ln and right-side node R1-Rn (excluding the fiber shuffle), thus simplifying overall system design and reducing cost. Moreover, such embodiments are also agnostic to the type of node used (e.g., compute node, memory node, etc.), node size (e.g., a two node board (see FIG. 5A), a four node board (see FIG. 4), etc.), WDM technology (e.g., silicon photonics (SiPH), vertical cavity surface emitting laser (VCSEL), etc.), signal protocols, fiber type, or other characteristics.

In various embodiments, the example systems discussed with respect to FIGS. 2-6B can be implemented in a variety of different configurations. As previously discussed, example systems can be implemented within blade chassis and equipment racks. In some embodiments, an equipment rack can include both a left system and a right system. In other embodiments, a first rack may include a plurality of left-side nodes, a second rack may include a plurality of right-side nodes, and NDM cables can be used to connect each left-side NDM node with each right-side NDM node. In still other embodiments, left-side systems and right-side systems can be blindmated through a midplane.

Figure 7A:
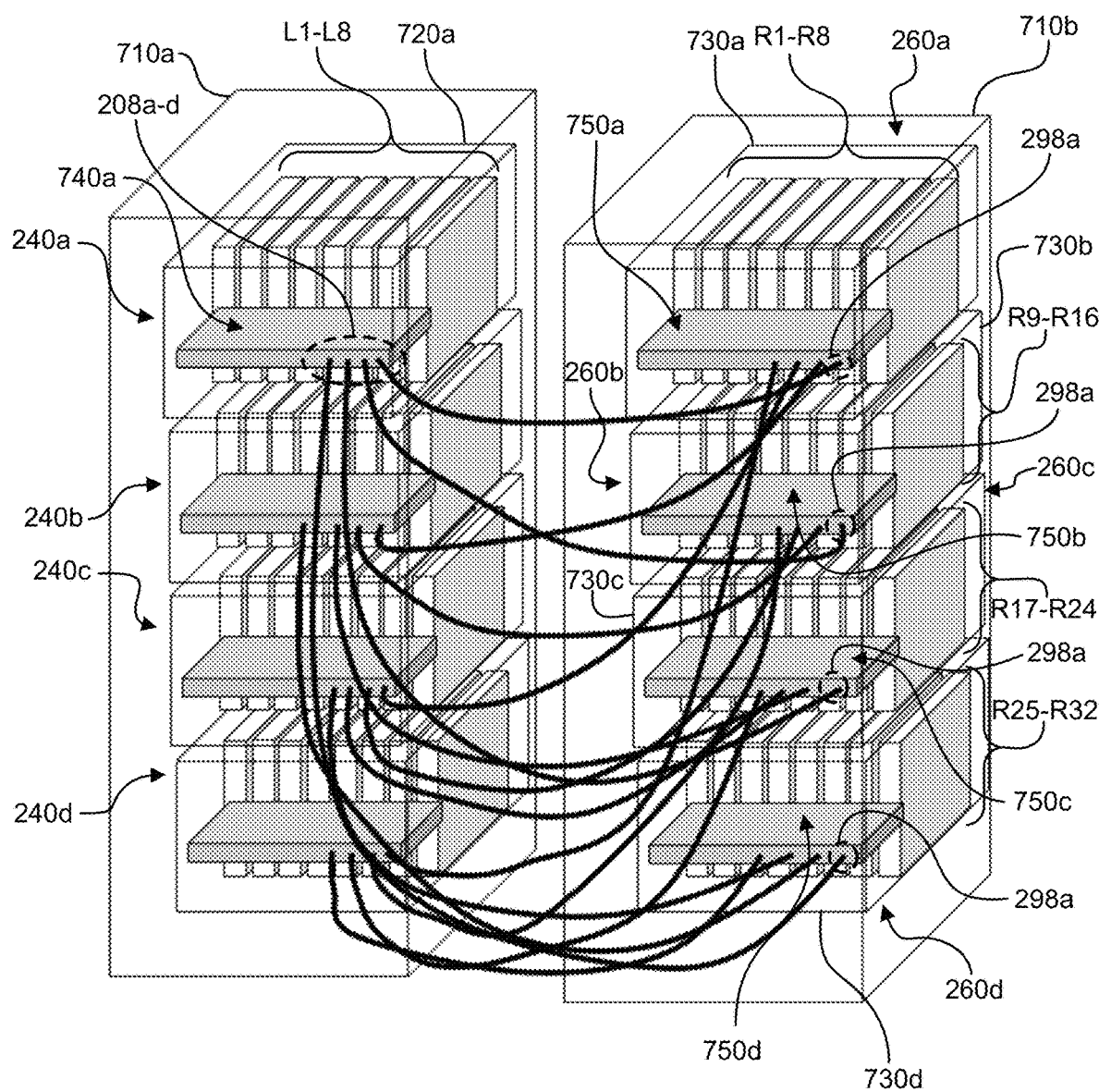
FIG. 7A illustrates an example blade-style system in accordance with embodiments of the technology disclosed herein.

FIG. 7A illustrates an example blade-type system 700A in accordance with embodiments of the present disclosure. As shown, system 700A comprises a plurality of left-side NDM nodes 240a-d within a left-side rack 710a and a plurality of right-side NDM nodes 260a-d within a right-side rack 710b. In various embodiments, each left-side NDM node 240a-d and right-side NDM node 260a-d can be similar to left-side NDM node 240a and right-side NDM node 260a of system 400 discussed with respect to FIG. 4 (i.e., having one-lane bandwidth). For ease of discussion, system 700A will be discussed with respect to left-side NDM node 240a being connected to right-side NDM nodes 260a-d. As shown in FIG. 7A, left-side NDM node 240a comprises a plurality of blade-type left-side nodes L1-L8 within the front of a left-side blade chassis 720a. A left-side fiber tray 740a may be optically connected to each of the plurality of left-side nodes L1-L8 within left-side NDM node 240a. In various embodiments, left-side fiber tray 740a may be orthogonally-mated to all of left-side nodes L1-L8 within left-side NDM node 240a.

Left-side fiber shuffle 206a (discussed with respect to FIG. 2) can be housed within left-side fiber tray 740a, routing the multiplexed fibers from the one or more optical transceivers 202 of each left-side node L1-L8 to a left-side NDM connector 208, such as left-side NDM connectors 208a-d of left-side NDM node 240a illustrated in FIG. 7A.

As shown, left-side fiber tray 740a can comprise four NDM connectors 208a-d, with left-side NDM connector 208a being the rightmost connector of left-side fiber tray 740a. To connect left-side NDM node 240a to the four right-side NDM nodes 260a-d in system 700A, a first NDM cable connects left-side NDM connector 208a of left-side fiber tray 740a to right-side NDM connector 298a of the right-side fiber tray 750a of right-side NDM node 260a, a second NDM cable connects left-side NDM connector 208b of left-side fiber tray 740a to right-side NDM connector 298a of the right-side fiber tray 750b of right-side NDM node 260b, a third NDM cable connects left-side NDM connector 208c of left-side fiber tray 740a to right-side NDM connector 298a of the right-side fiber tray 750c of right-side NDM node 260c, and a fourth NDM cable connects left-side NDM connector 208d of left-side fiber tray 740a to right-side NDM connector 298a of the right-side fiber tray 750d of right-side NDM node 260d. Accordingly, faceplate of left-side fiber tray 740a includes one left-side NDM connector 208 for each right-side NDM node 260a-d within system 700A. In this way, left-side nodes L1-L8 can be connected to right-side nodes R1-R32, across right-side NDM nodes 260a-d. Each right-side NDM connector 298a can be included within right-side fiber trays 750a-d, respectively. In various embodiments, additional right-side NDM connectors 298 can be included within each right-side fiber tray 750a-d. Right-side fiber trays 750a-d can comprise a right-side fiber shuffle 206b. In various embodiments, each right-side fiber tray 750a-d can comprise the same right-side fiber shuffle 206b.

Figure 7B:
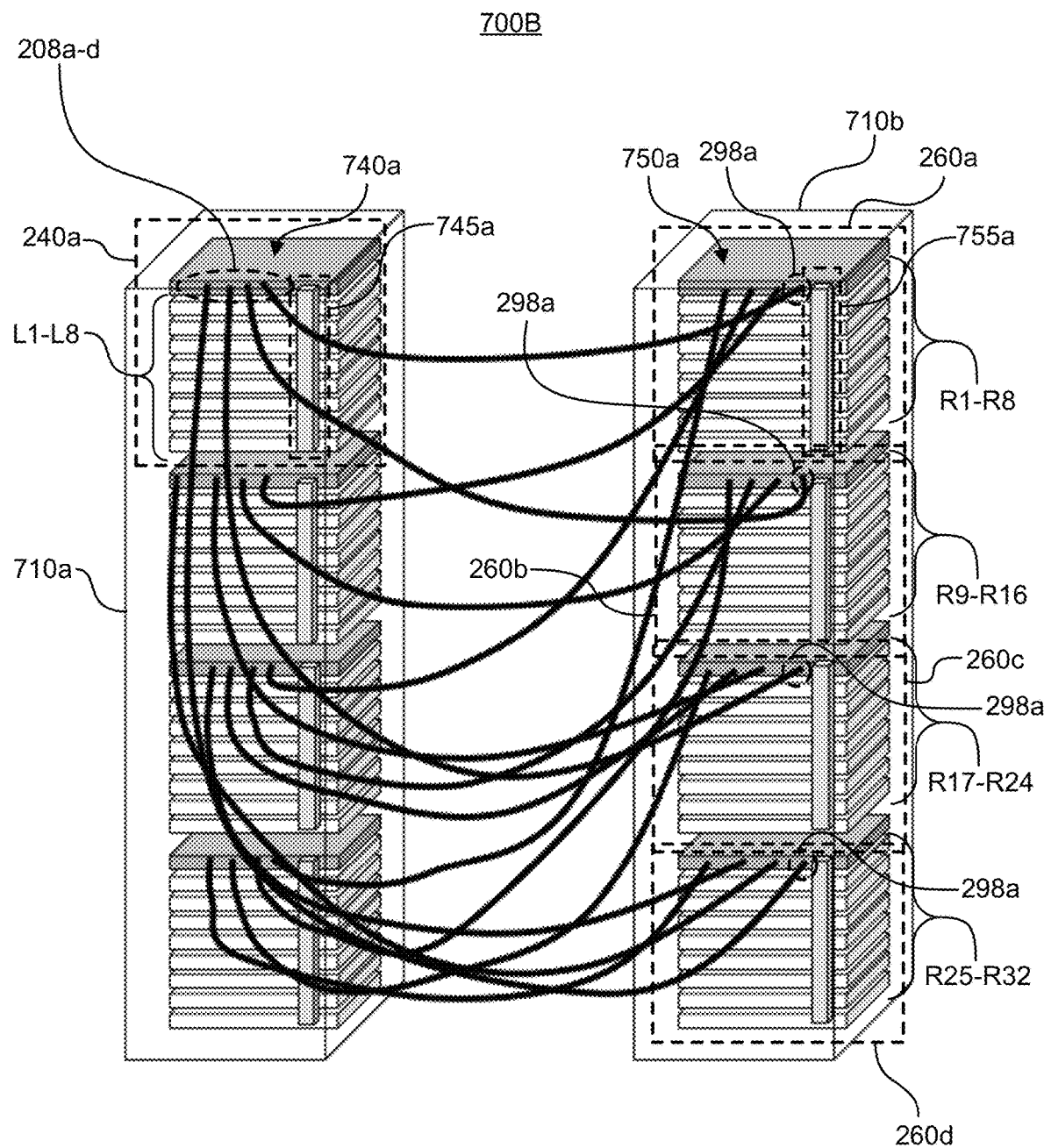
FIG. 7B illustrates an example rack-style system in accordance with embodiments of the technology disclosed herein.

FIG. 7B illustrates an example rack-style system 700B in accordance with embodiments of the present disclosure. System 700B is similar to the blade-style system 700A discussed with respect to FIG. 7A, but instead of each node being within a blade chassis, each NDM node comprises a fiber tray optically connected to a plurality of nodes through a plenum 745, 755. As illustrated, left-side NDM node 240a comprises left-side nodes L1-L8, each optically connected to left-side fiber tray 740a through a left-side node plenum 745a. Similar to system 700A discussed with respect to FIG. 7A, faceplate of left-side fiber tray 740a can comprise a plurality of left-side NDM connectors 208a-d, each left-side NDM connector 208a-d connected to a different right-side NDM connector 298a of a different right-side NDM node 260a-d over a different NDM cable.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A node-division multiplexing (NDM) apparatus comprising:
   a plurality of nodes;
   an electrical shuffle comprising a plurality of electrical traces, each electrical trace communicatively connected to a port of each of the plurality of nodes;
   at least one optical transceiver configured to multiplex a plurality of electrical signals from the plurality of nodes into a plurality of wave-division multiplexing (WDM) optical signals; and
   a fiber shuffle configured to route the plurality of WDM optical signals to and from a plurality of NDM connectors,
   wherein the electrical shuffle is configured to route the plurality of electrical signals from each port of the plurality of nodes to form one of a plurality of ordered sequences based on an order in which an electrical trace associated with a port of a given node is routed to an electrical-to-optical (EO) converter of the at least one optical transceiver.

2. The NDM apparatus of claim 1, further comprising a first M-set of nodes comprising a first subset of the plurality of nodes and a second M-set of nodes comprising a second subset of the plurality of nodes.

3. The NDM apparatus of claim 2, wherein the plurality of nodes comprises eight nodes, and M equals four.

4. The NDM apparatus of claim 2, wherein the plurality of nodes comprises four nodes, and M equals two.

5. The NDM apparatus of claim 1, wherein the plurality of ordered sequences comprises one or more of an ordered node sequence, a scrambled node sequence, a reverse node-pair sequence, and a reverse node sequence.

6. The NDM apparatus of claim 1, further comprising:
   the fiber shuffle comprises a straight-through fiber shuffle configured wherein a first WDM optical signal is routed to a corresponding first NDM connector of the plurality of NDM connectors; and
   the at least one optical transceiver comprises a 32-lane optical transceiver having eight EO converters,
   wherein:
      a first EO converter is communicatively routed to a first NDM connector of the plurality of NDM connectors;
      a second EO converter is communicatively routed to a second NDM connector of the plurality of NDM connectors;
      a third EO converter is communicatively routed to a third NDM connector of the plurality of NDM connectors;
      a fourth EO converter is communicatively routed to a fourth NDM connector of the plurality of NDM connectors;
      a fifth EO converter is communicatively routed to a fifth NDM connector of the plurality of NDM connectors;
      a sixth EO converter is communicatively routed to a sixth NDM connector of the plurality of NDM connectors;
      a seventh EO converter is communicatively routed to a seventh NDM connector of the plurality of NDM connectors; and
      as eight EO converter is communicatively routed to an eight NDM connector of the plurality of NDM connectors.

7. The NDM apparatus of claim 6, wherein the first NDM connector, the second NDM connector, the third NDM connector, the fourth NDM connector, and the fifth NDM connector each comprise a first ordered WDM optical signal, the sixth NDM connector comprises a second ordered WDM optical signal, the seventh NDM connector comprises a second ordered WDM optical signal, and the eight NDM connector comprises a second ordered WDM optical signal.

8. The NDM apparatus of claim 7, wherein:
   the first ordered WDM optical signal comprises:
      a first node of the plurality of nodes associated with a first wavelength of a set of WDM wavelengths of the at least one optical transceiver,
      a second node of the plurality of nodes associated with a second wavelength of the set of WDM wavelengths of the at least one optical transceiver,
      a third node of the plurality of nodes associated with a third wavelength of a set of WDM wavelengths of the at least one optical transceiver, and
      a fourth node of the plurality of nodes associated with a fourth wavelength of a set of WDM wavelengths of the at least one optical transceiver,
   the second ordered WDM optical signal comprises:
      the second node of the plurality of nodes associated with a first wavelength of a set of WDM wavelengths of the at least one optical transceiver,
      the first node of the plurality of nodes associated with a second wavelength of the set of WDM wavelengths of the at least one optical transceiver,
      the fourth node of the plurality of nodes associated with a third wavelength of a set of WDM wavelengths of the at least one optical transceiver, and
      the third node of the plurality of nodes associated with a fourth wavelength of a set of WDM wavelengths of the at least one optical transceiver,
   the third ordered WDM optical signal comprises:
      the third node of the plurality of nodes associated with a first wavelength of a set of WDM wavelengths of the at least one optical transceiver,
      the fourth node of the plurality of nodes associated with a second wavelength of the set of WDM wavelengths of the at least one optical transceiver,
      the first node of the plurality of nodes associated with a third wavelength of a set of WDM wavelengths of the at least one optical transceiver, and
      the second node of the plurality of nodes associated with a fourth wavelength of a set of WDM wavelengths of the at least one optical transceiver, and
   the fourth ordered WDM optical signal comprises:
      the fourth node of the plurality of nodes associated with a first wavelength of a set of WDM wavelengths of the at least one optical transceiver,
      the third node of the plurality of nodes associated with a second wavelength of the set of WDM wavelengths of the at least one optical transceiver,
      the second node of the plurality of nodes associated with a third wavelength of a set of WDM wavelengths of the at least one optical transceiver, and
      the first node of the plurality of nodes associated with a fourth wavelength of a set of WDM wavelengths of the at least one optical transceiver.

9. The NDM apparatus of claim 1, wherein the fiber shuffle comprises an NDM-ordered fiber shuffle configured to route a first WDM optical signal to an NDM connector of the plurality of NDM connectors other than a corresponding first NDM connector of the plurality of NDM connectors;

the plurality of NDM connectors comprising a 32-fiber NDM connector cable; and the at least one optical transceiver comprises a 32-lane optical transceiver having eight EO converters, wherein:
- a first EO converter is communicatively routed to a thirteenth NDM connector of the NDM connector cable;
- a second EO converter is communicatively routed to a fourteenth NDM connector of the NDM connector cable;
- a third EO converter is communicatively routed to a fifteenth NDM connector of the NDM connector cable;
- a fourth EO converter is communicatively routed to a sixteenth NDM connector of the NDM connector cable;
- a fifth EO converter is communicatively routed to a first NDM connector of the NDM connector cable;
- a sixth EO converter is communicatively routed to a second NDM connector of the NDM connector cable;
- a seventh EO converter is communicatively routed to a third NDM connector of the NDM connector cable; and
- as eight EO converter is communicatively routed to a fourth NDM connector of the NDM connector cable.

10. The NDM apparatus of claim 9, wherein each NDM connector of the NDM connector cable comprises a fiber pair, a first fiber having a transmit polarity and a second fiber having a receive polarity.

11. An optical system comprising:
- a left side comprising one or more left-side systems, each left-side system comprising:
  - a plurality of left-side nodes;
  - a set of left-side node-division multiplexing (NDM) nodes, each left-side NDM node comprising a plurality of M-sets of left-side nodes;
  - a plurality of optical transceivers, each optical transceiver connected to one of the plurality of M-sets of left-side nodes through a left-side electrical shuffle;
  - the left-side electrical shuffle configured to route each port of the plurality of left-side nodes in a given M-set of left-side nodes in an ordered sequence to one of a plurality of electrical-to-optical (EO) converters of a respective optical transceiver;
  - a left-side fiber shuffle configured to connect the plurality of optical transceivers to a plurality of left-side NDM connectors, each left-side NDM connector comprising a left-side wave-division multiplexing (WDM) optical signal having an ordered sequence WDM signal;
- a right side comprising one or more right-side systems, each right-side system comprising:
  - a plurality of right-side nodes;
  - a set of right-side NDM nodes, each right-side NDM node comprising a plurality of M-sets of right-side nodes;
  - a plurality of optical transceivers, each optical transceiver connected to one of the plurality of M-sets of right-side nodes through a right-side electrical shuffle;
  - the right-side electrical shuffle configured to route each port of the plurality of right-side nodes in a given M-set of right-side nodes in an ordered sequence to one of a plurality of EO converters of a respective optical transceiver;
  - a right-side fiber shuffle configured to connect the plurality of optical transceivers to a plurality of right-side NDM connectors, each right-side NDM connector comprising a right-side WDM optical signal having an ordered sequence WDM signal;
- an NDM connector cable configured to connect the plurality of left-side NDM connectors and the plurality of right-side NDM connectors, wherein the left-side fiber shuffle comprises a straight-through fiber shuffle and the right-side fiber shuffle comprises an NDM-ordered fiber shuffle.

12. The optical system of claim 11, wherein the left-side electrical shuffle, the right-side electrical shuffle, and the optical transceivers have the same configuration in the plurality of left-side nodes and the plurality of right-side nodes.

13. The optical system of claim 11, the NDM connector cable comprising an off the shelf optical connector cable.

14. The optical system of claim 11, wherein each left-side NDM node is connected to a right-side NDM node of the plurality of NDM nodes over a single NDM connector cable.

15. The optical system of claim 11, wherein two left-side NDM nodes of the plurality of left-side NDM nodes are connected to two right-side NDM nodes of the plurality of right-side NDM nodes over a single NDM connector cable comprising a plurality of optical fibers.

16. The optical system of claim 15, wherein the single NDM connector cable comprises a 32-fiber NDM connector cable.

17. The optical system of claim 16, wherein the single NDM connector cable comprises a 16-fiber NDM connector cable.

18. The optical system of claim 11, wherein a first subset of EO converters of an optical transceiver are routed to a first NDM connector by the left-side fiber shuffle, a second subset of EO converters of an optical transceiver are routed to a second NDM connector by the left-side fiber shuffle, and a third subset of EO converters of an optical transceiver are routed to a third NDM connector by the left-side fiber shuffle, wherein each left-side node of the plurality of left-side nodes is connected to a right-side node of the plurality of right-side nodes using two-lane bandwidth.

19. A node-division multiplexing (NDM) system comprising:
- a plurality of nodes;
- a primary input/output (I/O) card comprising:
  - a first electrical shuffle communicatively coupled to a first optical transceiver, the first optical transceiver configured to multiplex a first plurality of electrical signals from the plurality of nodes into a first plurality of wave-division multiplexing (WDM) optical signals;
- a secondary I/O card comprising:
  - a second electrical shuffle communicatively coupled to a second optical transceiver, the second optical transceiver configured to multiplex a second plurality of electrical signals from the plurality of nodes into a second plurality of WDM optical signals;
- a first fiber shuffle configured to route the first plurality of WDM optical signals to and from a first NDM node connector, the first NDM node connector configured to connect the plurality of nodes to a first set of opposite-side NDM nodes; and
- a second fiber shuffle configured to route the second plurality of WDM optical signals to and from a second NDM node connector, the second NDM node connector configured to connect the plurality of nodes to a second set of opposite-side NDM nodes, wherein the first electrical shuffle is configured to route the first plurality of electrical signals to form one of a plurality of ordered sequences based on an order in which the first plurality of electrical signals is routed to an electrical-to-optical (EO) converter of the first optical transceiver, and wherein the second electrical shuffle is configured to route the second plurality of electrical signals to form one of a plurality of ordered sequences based on an order in which the second plurality of electrical signals is routed to an electrical-to-optical (EO) converter of the second optical transceiver.

20. The NDM system of claim 19, wherein each WDM optical fiber of each NDM node connector comprises a first subset of wavelengths of a WDM wavelength set assigned to a first node of the plurality of nodes multiplexed on the WDM optical fiber and a second subset of wavelengths of the WDM wavelength set assigned to a second node of the plurality of nodes multiplexed on the WDM optical fiber.

* * * * *